(12) United States Patent
Kaneko et al.

(10) Patent No.: US 8,449,789 B2
(45) Date of Patent: *May 28, 2013

(54) LUBRICANT COMPOSITION FOR REFRIGERATING MACHINES

(75) Inventors: Masato Kaneko, Ichihara (JP); Harutomo Ikeda, Ichihara (JP); Tokue Sato, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 199 days.

This patent is subject to a terminal disclaimer.

(21) Appl. No.: 12/867,679

(22) PCT Filed: Feb. 3, 2009

(86) PCT No.: PCT/JP2009/051743
§ 371 (c)(1),
(2), (4) Date: Nov. 19, 2010

(87) PCT Pub. No.: WO2009/101872
PCT Pub. Date: Aug. 20, 2009

(65) Prior Publication Data
US 2011/0057146 A1    Mar. 10, 2011

(30) Foreign Application Priority Data
Feb. 15, 2008 (JP) ................. 2008-035254

(51) Int. Cl.
C09K 5/04 (2006.01)
(52) U.S. Cl.
USPC .......................................................... 252/68
(58) Field of Classification Search
USPC .......................................................... 252/68
See application file for complete search history.

(56) References Cited

U.S. PATENT DOCUMENTS

| | | | |
|---|---|---|---|
| 5,449,472 A * | 9/1995 | Egawa et al. ................ | 252/68 |
| 2003/0199401 A1* | 10/2003 | Tazaki ......................... | 508/579 |
| 2005/0233923 A1 | 10/2005 | Singh et al. | |
| 2006/0243944 A1 | 11/2006 | Minor et al. | |
| 2007/0007488 A1* | 1/2007 | Singh et al. ................ | 252/68 |
| 2008/0157022 A1 | 7/2008 | Singh et al. | |
| 2009/0062167 A1 | 3/2009 | Kaneko | |
| 2009/0072187 A1 | 3/2009 | Kaneko | |
| 2009/0092556 A1 | 4/2009 | Singh et al. | |
| 2010/0108936 A1 | 5/2010 | Kaneko | |
| 2010/0175421 A1 | 7/2010 | Kaneko et al. | |
| 2010/0252772 A1 | 10/2010 | Kaneko | |
| 2011/0136712 A1 | 6/2011 | Kaneko | |

FOREIGN PATENT DOCUMENTS

| | | |
|---|---|---|
| JP | 10-237477 | 9/1998 |
| JP | 10-265790 | 10/1998 |
| JP | 11 012585 | 1/1999 |
| JP | 2007 532767 | 11/2007 |
| WO | 93 15756 | 8/1993 |
| WO | 2004 037752 | 5/2004 |
| WO | WO 2005/103188 A1 | 11/2005 |
| WO | 2006 069362 | 6/2006 |
| WO | WO 2007/026647 A1 | 3/2007 |
| WO | 2007 105452 | 9/2007 |

OTHER PUBLICATIONS

U.S. Appl. No. 12/867,183, filed Aug. 11, 2010, Kaneko, et al.
Extended European Search Report issued Sep. 16, 2011, in Patent Application No. 09709827.1.
Japanese Office Action issued Nov. 27, 2012, in Japanese Patent Application No. 2008-035254.

* cited by examiner

*Primary Examiner* — John Hardee
(74) *Attorney, Agent, or Firm* — Oblon, Spivak, McClelland, Maier & Neustadt, L.L.P.

(57) ABSTRACT

Provided is a lubricating oil composition for a refrigerator, the refrigerator using a refrigerant which has a low global warming potential and is applicable to, in particular, current car air conditioning systems or the like, that is, the refrigerant including at least one kind of fluorine-containing organic compounds selected from compounds represented by the following molecular formula (A) or including a combination of the fluorine-containing organic compound and a saturated fluorinated hydrocarbon compound, $$C_p O_q F_r R_s \qquad (A)$$

where: R represents Cl, Br, I, or H; p represents an integer of 1 to 6, q represents an integer of 0 to 2, r represents an integer of 1 to 14, and s represents an integer of 0 to 13; and provided that, when q represents 0, p represents 2 to 6 and one or more carbon-carbon unsaturated bonds are included in molecules, in which a base oil contained in the composition includes as a main component a polyvinyl ether derivative having a hydroxyl value of 17 mgKOH/g or less.

15 Claims, No Drawings

LUBRICANT COMPOSITION FOR REFRIGERATING MACHINES

TECHNICAL FIELD

The present invention relates to a lubricating oil composition for a refrigerator, and more specifically, to a lubricating oil composition for a refrigerator using a specific refrigerant which has a low global warming potential, such as an unsaturated fluorinated hydrocarbon compound applicable to, in particular, current car air conditioner systems or the like. The lubricating oil composition, which comprises a base oil including as a main component a polyoxyalkylene glycol derivative, has excellent stability, and suppresses the generation of sludge in a sealed tube test.

BACKGROUND ART

In general, a compression-type refrigerator includes at least a compressor, a condenser, an expansion mechanism (such as an expansion valve), an evaporator, and an optional drying apparatus, and a liquid mixture of refrigerant and lubricating oil (refrigerator oil) circulates in a closed system of the refrigerator. In such a refrigerator, generally, the compressor is operated at high temperature, while the cooler is operated at low temperature, although the difference in temperature varies depending on the type of the refrigerator. Therefore, a refrigerant and a lubricating oil must circulate in the system without causing phase separation within a wide temperature range of high to low temperature. Generally, a mixture of refrigerant and lubricating oil has a phase separating region in a low-temperature range and in a high-temperature range. The highest phase separation temperature in the low-temperature range is preferably −10° C. or lower, particularly preferably −20° C. or lower, whereas the lowest phase separation temperature in the high-temperature range is preferably 30° C. or higher, particularly preferably 40° C. or higher. When phase separation occurs during operation of a refrigerator, the service life and efficiency of the refrigerator are considerably impaired. For example, when phase separation between refrigerant and lubricating oil occurs in a compressor, lubrication of a movable member is impaired, thereby causing seizure or a similar phenomenon, resulting in considerable shortening of the service life of the refrigerator. When phase separation occurs in an evaporator, a viscous lubricant remains, thereby lowering heat exchange efficiency.

A chlorofluorocarbon (CFC), a hydrochlorofluorocarbon (HCFC), or the like has been heretofore mainly used as a refrigerant for a refrigerator. However, such compounds each contain chlorine that is responsible for environmental issues, so investigation has been conducted on a chlorine-free alternative refrigerant such as a hydrofluorocarbon (HFC). A hydrofluorocarbon typified by, for example, 1,1,1,2-tetrafluoroethane, difluoromethane, pentafluoroethane, or 1,1,1-trifluoroethane (hereinafter referred to as "R134a", "R32", "R125", or "R143a", respectively) has been attracting attention, and, for example, R134a has been used in a car air conditioner system.

However, because the influence of the HFC is also concerned from the viewpoint of the global warming, so-called natural refrigerants such as carbon dioxide have attracted attention as alternative refrigerants suitable for environmental protection. The carbon dioxide requires high pressure, and hence cannot be used in the current car air conditioner system.

A refrigerant having a specific polar structure in the molecules such as an unsaturated fluorinated hydrocarbon compound (see, for example, Patent Document 1), a fluorinated ether compound (see, for example, Patent Document 2), a fluorinated alcohol compound, or a fluorinated ketone compound has been found to be a refrigerant which has a low global warming potential and can be used in a current car air conditioner system.

The lubricating oil for a refrigerator that uses the refrigerant is demanded to have excellent compatibility with the refrigerant and stability.

Patent Document 1: 2006-503961 A
Patent Document 2: JP 07-507342 A

DISCLOSURE OF THE INVENTION

Problems to be Solved by the Invention

Under the circumstances, an object of the present invention is to provide a lubricating oil composition for a refrigerator using a refrigerant having a specific structure, such as an unsaturated fluorinated hydrocarbon compound, the refrigerant having a low global warming potential and being applicable to, in particular, current car air conditioner systems or the like. The lubricating oil composition has excellent stability as well as excellent compatibility with the refrigerant.

Means for Solving the Problems

The inventors of the present invention have studied extensively to achieve the object. As a result, the inventors found that the object could be achieved by a base oil including as a main component using a polyvinylether derivative having a hydroxyl value equal to or less than a certain value, and preferably using a specific material for a sliding part in a refrigerator. The present invention has been completed based on those findings.

That is, the present invention provides:

(1) a lubricating oil composition for a refrigerator, the refrigerator using a refrigerant including at least one kind of fluorine-containing organic compounds selected from compounds represented by the following molecular formula (A) or including a combination of the fluorine-containing organic compound and a saturated fluorinated hydrocarbon compound, $$C_p O_q F_r R_s \qquad (A)$$

where: R represents Cl, Br, I, or H; p represents an integer of 1 to 6, q represents an integer of 0 to 2, r represents an integer of 1 to 14, and s represents an integer of 0 to 13; and provided that, when q represents 0, p represents 2 to 6 and one or more carbon-carbon unsaturated bonds are included in molecules, wherein a base oil contained in the composition includes as a main component a polyvinyl ether derivative having a hydroxyl value of 17 mgKOH/g or less;

(2) the lubricating oil composition for a refrigerator according to the item (1), in which the refrigerant is formed of an unsaturated fluorinated hydrocarbon compound having 2 to 3 carbon atoms or a combination of a saturated fluorinated hydrocarbon compound having 1 to 3 carbon atoms and the unsaturated fluorinated hydrocarbon compound having 2 to 3 carbon atoms;

(3) the lubricating oil composition for a refrigerator according to the item (1), in which the base oil has a kinematic viscosity of 2 to 50 mm$^2$/s at 100° C.;

(4) the lubricating oil composition for a refrigerator according to the item (1), in which the base oil has a molecular weight of 500 or more;

(5) the lubricating oil composition for a refrigerator according to the item (1), in which the polyvinyl ether derivative includes as a main component a vinyl-based compound having a constituent unit represented by the following general formula (I),

[Chem 1]

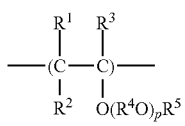
(I)

where: $R^1$, $R^2$, and $R^3$ each independently represent a hydrogen atom or a hydrocarbon group having 1 to 8 carbon atoms; $R^4$ represents a divalent hydrocarbon group having 2 to 10 carbon atoms; $R^5$ represents a hydrocarbon group having 1 to 10 carbon atoms; and p represents the number of the repeating and such a number that average value thereof is in the range of 0 to 10;

(6) the lubricating oil composition for a refrigerator according to the item (1), including at least one kind of additive selected from an extreme pressure agent, an oiliness agent, an antioxidant, an acid scavenger, a metal deactivator, and an anti-foaming agent;

(7) the lubricating oil composition for a refrigerator according to the item (1), in which a sliding part in a refrigerator is formed of an engineering plastic or includes an organic coating film or an inorganic coating film.

(8) the lubricating oil composition for a refrigerator according to the item (7), in which the organic coating film is a polytetrafluoroethylene coating film, a polyimide coating film, a polyamideimide coating film, or a thermosetting insulating film formed using a resin coating material containing a crosslinking agent and a resin substrate formed of a polyhydroxyether resin and a polysulfone-based resin;

(9) the lubricating oil composition for a refrigerator according to the item (7), in which the inorganic coating film is a graphite film, a diamond-like carbon film, a tin film, a chromium film, a nickel film, or a molybdenum film;

(10) the lubricating oil composition for a refrigerator according to the item (1), which is used in a car air conditioner, an electrically-driven car air conditioner, a gas heat pump, an air conditioner, a cold storage, various hot-water supply systems for a vending machine or a showcase, or a refrigerating and heating system; and

(11) the lubricating oil composition for a refrigerator according to the item (10), in which a water content in a system is 300 mass ppm or less and a residual air content in the system is 10 kPa or less.

Effects of the Invention

According to the present invention, there can be provided a lubricating oil composition for a refrigerator using a refrigerant having a specific structure, such as an unsaturated fluorinated hydrocarbon compound, the refrigerant having a low global warming potential and being applicable to, in particular, current car air conditioner systems or the like. The lubricating oil composition has excellent stability as well as excellent compatibility with the refrigerant and suppresses the generation of sludge in a sealed tube test.

BEST MODE FOR CARRYING OUT THE INVENTION

The lubricating oil composition for a refrigerator of the present invention is used for a refrigerator using a refrigerant including at least one kind of fluorine-containing organic compounds selected from compounds represented by the following molecular formula (A) or including a combination of the fluorine-containing organic compound and a saturated fluorinated hydrocarbon compound, $$C_pO_qF_rR_s \qquad (A)$$

where: R represents Cl, Br, I, or H; p represents an integer of 1 to 6, q represents an integer of 0 to 2, r represents an integer of 1 to 14, and s represents an integer of 0 to 13; and provided that, when q represents 0, p represents an integer of 2 to 6 and one or more carbon-carbon unsaturated bonds are included in molecules.

<Refrigerant>

The molecular formula (A) represents the kind and the number of the elements in the molecules. The formula (A) represents the fluorine-containing organic compound in which p as the number of the carbon atoms C represents 1 to 6. As long as the fluorine-containing organic compound is a fluorine-containing organic compound having 1 to 6 carbon atoms, the fluorine-containing organic compound can have physical and chemical properties required for the refrigerant, such as a boiling point, a coagulation point, and an evaporative latent heat.

In the molecular formula (A), a binding form of p carbon atoms represented by $C_p$ includes a carbon-carbon single bond, an unsaturated bond such as a carbon-carbon double bond, a carbon-oxygen double bond, and the like. The carbon-carbon unsaturated bond is preferably a carbon-carbon double bond from the viewpoint of stability. The number of the carbon-carbon double bond is 1 or more or preferably 1.

In addition, in the molecular formula (A), a binding form of q oxygen atoms represented by $O_q$ is preferably an oxygen atom of ether group, hydroxyl group or carbonyl group. The number of the oxygen atoms q may be 2, and the case where the compound has two ether groups, hydroxyl groups, or the like is also included.

In addition, in the case where q represents 0 in $O_q$ and no oxygen atom is included in the molecules, p represents 2 to 6, and the molecules have one or more unsaturated bonds such as a carbon-carbon double bond. That is, at least one of binding forms of p carbon atoms represented by $C_p$ needs to be a carbon-carbon unsaturated bond.

In addition, in the molecular formula (A), R represents Cl, Br, I, or H, and may represent any one of them. R preferably represents H because of its less possibility of destroying an ozone layer.

As described above, as the fluorine-containing organic compound represented by the molecular formula (A), an unsaturated fluorinated hydrocarbon compound, a fluorinated ether compound, a fluorinated alcohol compound, a fluorinated ketone compound and the like are suitably exemplified.

Hereinafter, those compounds are described.

[Unsaturated Fluorinated Hydrocarbon Compound]

In the present invention, as the unsaturated fluorinated hydrocarbon compound used as a refrigerant for a refrigerator, there are exemplified unsaturated fluorinated hydrocarbon compounds where, in the molecular formula (A), R represents H, and p represents 2 to 6, q represents 0, r represents 1 to 12, and s represents 0 to 11.

Examples of preferred unsaturated fluorinated hydrocarbon compounds include a fluorinated compound of a straight-chain or branched chain olefin having 2 to 6 carbon atoms and a fluorinated compound of a cyclic olefin having 4 to 6 carbon atoms.

Specific examples thereof include ethylene having 1 to 3 fluorine atoms introduced, propene having 1 to 5 fluorine atoms introduced, butene having 1 to 7 fluorine atoms introduced, pentene having 1 to 9 fluorine atoms introduced, hexene having 1 to 11 fluorine atoms introduced, cyclobutene having 1 to 5 fluorine atoms introduced, cyclopentene having 1 to 7 fluorine atoms introduced, and cyclohexene having 1 to 9 fluorine atoms introduced.

Of those unsaturated fluorinated hydrocarbon compounds, unsaturated fluorinated hydrocarbon having 2 to 3 carbon atoms are preferable. Examples thereof include a fluorinated compound of ethylene such as trifluoroethylene and a fluorinated compound of propene, of which a fluorinated compound of propene is preferable. Examples of the fluorinated compound of propene includes various kinds of isomers of pentafluoropropene, 3,3,3-trifluoropropene, and 2,3,3,3-tetrafluoropropene, and 1,2,3,3,3-pentafluoropropene (HFC1225ye) and 2,3,3,3-tetrafluoropropene (HFC1234yf) are particularly suitable.

In the present invention, one kind of the unsaturated fluorinated hydrocarbon compounds may be used alone or two or more kinds thereof may be used in combination.

In addition, a combination of a saturated fluorinated hydrocarbon compound having 1 to 3 carbon atoms and an unsaturated fluorinated hydrocarbon compound having 2 to 3 carbon atoms is also suitably used.

Examples of the saturated fluorinated hydrocarbon compound having 1 to 3 carbon atoms include R32, R125, R134a, R134b, R152a, and R245fa. Of those, R32, R134a, and R152a are suitable. In the present invention, one kind of the saturated fluorinated hydrocarbon compound may be used alone or two or more kinds thereof may be used in combination.

Examples of the combination of the saturated fluorinated hydrocarbon compound having 1 to 3 carbon atoms and the unsaturated fluorinated hydrocarbon compound having 2 to 3 carbon atoms include a combination of $CH_2F_2$ (HFC32) and the HFC1225ye, a combination of $CHF_2CH_3$ (HFC152a) and HFC1225ye, and a combination of $CF_3I$ and the HFC1234yf.

[Fluorinated Ether Compound]

In the present invention, as the fluorinated ether compound used as a refrigerant for a refrigerator, there are exemplified fluorinated ether compounds where, in the molecular formula (A), R represents H, and p represents 2 to 6, q represents 1 to 2, r represents 1 to 14, and s represents 0 to 13.

Examples of preferred fluorinated ether compound include: a fluorinated compound of a chain aliphatic ether having 2 to 6 carbon atoms, 1 or 2 ether bonds, and a straight-chain or branched alkyl group; and a fluorinated compound of a cyclic aliphatic ether having 3 to 6 carbon atoms and 1 to 2 ether bonds.

Specific examples thereof include dimethyl ethers having 1 to 6 fluorine atoms introduced, methyl ethyl ethers having 1 to 8 fluorine atoms introduced, dimethoxymethanes having 1 to 8 fluorine atoms introduced, methylpropyl ethers having 1 to 10 fluorine atoms introduced, methylbutyl ethers having 1 to 12 fluorine atoms introduced, ethylpropyl ethers having 1 to 12 fluorine atoms introduced, oxetanes having 1 to 6 fluorine atoms introduced, 1,3-dioxoranes having 1 to 6 fluorine atoms introduced, and tetrahydrofurans having 1 to 8 fluorine atoms introduced.

Examples of those fluorinated ether compounds include hexafluorodimethyl ether, pentafluorodimethyl ether, bis(difluoromethyl)ether, fluoromethyl trifluoromethyl ether, trifluoromethyl methyl ether, perfluorodimethoxy methane, 1-trifluoromethoxy-1,1,2,2-tetrafluoroethane, difluoromethoxy pentanefluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolane, various isomers of pentafluorooxetane, and various isomers of tetrafluorooxetane.

In the present invention, one kind of the fluorinated ether compounds may be used alone or two or more kinds thereof may be used in combination.

[Fluorinated Alcohol Compound]

In the present invention, as the fluorinated alcohol compound used as a refrigerant for a refrigerator and represented by the general formula (A), there are exemplified fluorinated ether compounds where, in the molecular formula (A), R represents H, p represents 1 to 6, q represents 1 to 2, r represents 1 to 13, and s represents 1 to 13.

Examples of preferred fluorinated alcohol compound include a fluorinated compound of a straight-chain or branched aliphatic alcohols each having 1 to 6 carbon atoms and 1 or 2 hydroxyl groups.

Specific examples thereof include methyl alcohols having 1 to 3 fluorine atoms introduced, ethyl alcohols having 1 to 5 fluorine atoms introduced, propyl alcohols having 1 to 7 fluorine atoms introduced, butyl alcohols having 1 to 9 fluorine atoms introduced, pentyl alcohols having 1 to 11 fluorine atoms introduced, ethylene glycols having 1 to 4 fluorine atoms introduced, and propylene glycols having 1 to 6 fluorine atoms introduced.

Examples of those fluorinated alcohol compounds include monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers heptafluorobutyl alcohol, various isomers of octafluorobutyl alcohol, nonafluorobutyl alcohol, various isomers of difluoroethylene glycol, trifluoroethylene glycol, tetrafluoroethylene glycol, and various isomers of difluoropropylene glycol, various isomers of trifluoropropylene glycol, various isomers of tetrafluoropropylene glycol, various isomers of pentafluoropropylene glycol, a fluorinated propylene glycol such as hexafluoropropylene glycol, and a fluorinated trimethylene glycol corresponding to the fluorinated propylene glycol.

In the present invention, one kind of the fluorinated alcohol compounds may be used alone or two or more kinds thereof may be used in combination.

[Fluorinated Ketone Compound]

In the present invention, as the fluorinated ketone compound used as a refrigerant for a refrigerator, there are exemplified fluorinated ketone compounds in which, in the molecular formula (A), R represents H, and p represents 2 to 6, q represents 1 to 2, r represents 1 to 12, and s represents 0 to 11.

Examples of preferred fluorinated ketone compounds include fluorinated compounds of aliphatic ketones each having 3 to 6 carbon atoms and a straight-chain or branched alkyl group.

Specific examples thereof include acetones having 1 to 6 fluorine atoms introduced, methyl ethyl ketones having 1 to 8 fluorine atoms introduced, diethyl ketones having 1 to 10 fluorine atoms introduced, and methyl propyl ketones having 1 to 10 fluorine atoms introduced.

Examples of those fluorinated ketone compounds include hexafluorodimethyl ketone, pentafluorodimethyl ketone, bis (difluoromethyl)ketone, fluoromethyl trifluoromethyl ketone, trifluoromethyl methyl ketone, perfluoromethyl ethyl ketone, trifluoromethyl-1,1,2,2-tetrafluoroethyl ketone, difluoromethyl pentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone, and difluoromethyl-2,2,2-trifluoroethyl ketone.

In the present invention, one kind of the fluorinated ketone compound may be used alone or two or more kinds thereof may be used in combination.

[Saturated Fluorinated Hydrocarbon Compound]

The saturated fluorinated hydrocarbon compound is a refrigerant that can be mixed, as required, in at least one kind of the fluorine-containing organic compounds selected from the compounds represented by the general formula (A).

As the saturated fluorinated hydrocarbon compound, a fluorinated compound of alkane having 1 to 4 carbon atoms is preferable and fluorinated compounds of methane or ethane having 1 to 2 carbon atoms such as trifluoromethane, difluoromethane, 1,1-difluoroethane, 1,1,1-trifluoroethane, 1,1,2-trifluoroethane, 1,1,1,2-tetrafluoroethane, 1,1,2,2-tetrafluoroethane, and 1,1,1,2,2-pentafluoroethane are particularly suitable. In addition, as the saturated fluorinated hydrocarbon compound, the fluorinated alkane may be halogenated with a halogen atom other than fluorine, and trifluoroiodomethane ($CF_3I$) and the like are exemplified. One kind of the saturated fluorinated hydrocarbon compound may be used alone or two or more kinds thereof may be used in combination.

In addition, the blending amount of the saturated fluorinated hydrocarbon compound is typically 30 mass % or less, preferably 20 mass % or less, and more preferably 10 mass % or less based on the total amount of the refrigerant.

The lubricating oil composition for a refrigerator of the present invention (hereinafter may be referred to as refrigerator oil composition) is a lubricating oil composition for a refrigerator which uses the refrigerant, in which the lubricating oil composition for a refrigerator uses a base oil including as a main component a polyvinylether derivative having a hydroxyl value of 17 mgKOH/g or less.

[Base Oil]

When the polyvinyl ether derivative used as a main component of the base oil has a hydroxyl value of 17 mgKOH/g or less, the stability of the refrigerator oil composition to be obtained is improved and the generation of the sludge is suppressed in a sealed tube test. The hydroxyl value of the polyvinyl ether derivative is preferably 15 mgKOH/g or less and more preferably 10 mgKOH/g or less.

The polyvinyl ether derivatives are each a compound including as a main component a polyvinyl-based compound having a constitutional unit represented by the following general formula (I).

[Chem 2]

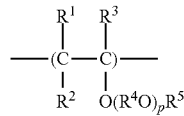

(I)

In the general formula (I), $R^1$, $R^2$, and $R^3$ each represent a hydrogen atom or a hydrocarbon group having 1 to 8 carbon atoms and may be identical to or different from one another.

The hydrocarbon group herein specifically refers to: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methyl cyclohexyl groups, various ethyl cyclohexyl groups, and various dimethyl cyclohexyl groups; aryl groups such as a phenyl group, various methyl phenyl groups, various ethyl phenyl groups, and various dimethyl phenyl groups; and aryl alkyl groups such as a benzyl group, various phenyl ethyl groups, and various methyl benzyl groups. It should be noted that those $R^1$, $R^2$, and $R^3$ each particularly preferably represent a hydrogen atom or a hydrocarbon group having 3 or less carbon atoms.

On the other hand, $R^4$ in the general formula (I) represent a divalent hydrocarbon group having 2 to 10 carbon atoms. Specific examples of the divalent hydrocarbon group having 2 to 10 carbon atoms herein include: a divalent aliphatic group such as an ethylene group, a phenyl ethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, and various decylene groups; alicyclic groups in which alicyclic hydrocarbon, such as cyclohexane, methylcyclohexane, ethylcyclohexane, dimethylcyclohexane, and propylcyclohexane, has two bonding sites; divalent aromatic hydrocarbon groups such as various phenylene groups, various methylphenylene groups, various ethylphenylene groups, various dimethylphenylene groups, and various naphthylenes; alkyl aromatic groups having monovalent bonding sites in each of the alkyl group portion and the aromatic portion of the alkyl aromatic hydrocarbon such as toluene, xylene, and ethyl benzene; and alkyl aromatic groups each having a bonding site in the alkyl group portion of a polyalkyl aromatic hydrocarbon such as xylene and diethyl benzene. Of those, aliphatic groups having 2 to 4 carbon atoms are particularly preferable. In addition, multiple $R^4O$'s are identical to or different from one another.

It should be noted that p in the general formula (I) represents the number of the repeating and such a number that average value thereof is in the range of 0 to 10 or preferably 0 to 5.

In addition, $R^5$ in the general formula (I) represents a hydrocarbon group having 1 to 10 carbon atoms. The hydrocarbon group herein specifically refers to: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methyl cyclohexyl groups, various ethyl cyclohexyl groups, various propyl cyclohexyl groups, and various dimethyl cyclohexyl groups; aryl groups such as a phenyl group, various methyl phenyl groups, various ethyl phenyl groups, various dimethyl phenyl groups, various propyl phenyl groups, various trimethyl phenyl groups, various butyl phenyl groups, and various naphthyl groups; and aryl alkyl groups such as a benzyl group, various phenyl ethyl groups, various methyl benzyl groups, various phenyl propyl groups, and various phenyl butyl groups. Of those, a hydrocarbon group having 8 or less carbon atoms is preferable. When p represents 0, an alkyl group having 1 to 6 carbon atoms is preferable, and when p represents 1 or more, an alkyl group having 1 to 4 carbon atoms is particularly preferable.

The polyvinyl ether-based compound in the present invention has a constitutional unit represented by the general formula (I). The number of the repeating thereof (that is, polymerization degree) may be appropriately selected according to a desired kinematic viscosity and is typically 2 to 50 mm²/s (100° C.) or preferably 3 to 40 mm²/s (100° C.).

The polyvinyl ether-based compound in the present invention can be produced by polymerization of the corresponding vinyl ether-based monomer. The vinyl ether-based monomer that can be used herein is represented by the following general formula (II),

[Chem 3]

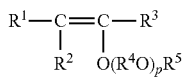

(II)

where $R^1$, $R^2$, $R^3$, $R^4$, and $R^5$, and p each have the same meaning as that described above. As the vinyl ether-based monomer, there are various compounds corresponding to the polyvinyl ether-based compound. Examples thereof include: vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxy-propyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, and vinyl-2,6,9-trioxa-4-decyl ether; 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene. Those vinyl ether-based monomers can be produced by any known methods.

The terminals of the polyvinyl ether-based compound having the constitutional unit represented by the general formula (I) used as a main component of the refrigerator oil composition of the present invention can be converted to a desired structure by a method in this application and a known method. As a converted group, a saturated hydrocarbon, an ether, an alcohol, a ketone, an amide, and a nitrile are exemplified.

As the polyvinyl ether-based compound used in the base oil in the refrigerator oil composition of the present invention, a compound having the following terminal structure is suitable.

That is, the polyvinyl ether-based compound has:
(1) a structure in which one of the terminals is represented by the following general formula (III),

[Chem 4]

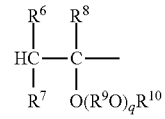

(III)

where $R^6$, $R^7$, and $R^8$ each represent a hydrogen atom, or a hydrocarbon group having 1 to 8 carbon atoms and may be identical to or different from one another, $R^9$ represents a divalent hydrocarbon group having 2 to 10 carbon atoms, $R^{10}$ represents a hydrocarbon group having 1 to 10 carbon atoms, q represents such a number that an average value thereof is 0 to 10, and in the case where multiple $R^9O$'s are present, multiple $R^9O$'s may be identical to or different from one another, and the other terminal is represented by the following general formula (IV),

[Chem 5]

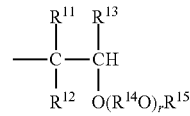

(IV)

where $R^{11}$, $R^{12}$, and $R^{13}$ each represent a hydrogen atom, or a hydrocarbon group having 1 to 8 carbon atoms and may be identical to or different from one another, $R^{14}$ represents a divalent hydrocarbon group having 2 to 10 carbon atoms, $R^{15}$ represents a hydrocarbon group having 1 to 10 carbon atoms, r represents such a number that an average value thereof is 0 to 10, and when multiple $R^{14}O$'s are present, multiple $R^{14}O$'s may be identical to or different from one another;

(2) a structure in which one of the terminals is represented by the general formula (III) and the other terminal is represented by the following general formula (V),

[Chem 6]

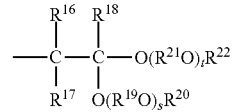

(V)

where $R^{16}$, $R^{17}$, and $R^{18}$ each represent a hydrogen atom, or a hydrocarbon group having 1 to 8 carbon atoms and may be identical to or different from one another, $R^{19}$ and $R^{21}$ each represent a divalent hydrocarbon group having 2 to 10 carbon atoms and may be identical to or different from each other, $R^{20}$ and $R^{22}$ each represent a hydrocarbon group having 1 to 10 carbon atoms and may be identical to or different from each other, s and t each represent such a number that an average value thereof is 0 to 10 and my be identical to or different from each other, when multiple $R^{19}O$'s are present, multiple $R^{19}O$'s may be identical to or different from one another, and when multiple $R^{21}O$'s are present, multiple $R^{21}O$'s may be identical to or different from one another;
(3) a structure in which one of the terminals is represented by the general formula (III) and the other terminal is a compound having an olefinic, unsaturated bond; or
(4) a structure in which one of the terminals is represented by the general formula (III) and the other terminal is represented by the following general formula (VI),

[Chem 7]

(VI)

where $R^{23}$, $R^{24}$, and $R^{25}$ each represent a hydrogen atom, or a hydrocarbon group having 1 to 8 carbon atoms and may be identical to or different from one another.

The polyvinyl ether-based compound may be a mixture including two or more kinds of the polyvinyl ether-based compounds selected from those having the terminal structures in the items (1) to (4). As the mixture, for example, a mixture of the compounds in the items (1) and (4) and a mixture of the compounds in the items (2) and (3) are preferably exemplified.

In the refrigerator oil composition of the present invention, as a base oil, a substance including as a main component at least one kind selected from polyvinyl ether derivatives. Here, the phrase "including as a main component" refers to including the polyvinyl ether derivative at a rate of 50 mass % or more. The content of the polyvinyl ether derivative in the base oil is preferably 70 mass % or more, more preferably 90 mass % or more, and still more preferably 100 mass %.

In the present invention, the kinematic viscosity of the base oil at 100° C. is preferably 2 to 50 mm²/s, more preferably 3 to 40 mm²/s, and still more preferably 4 to 30 mm²/s. When the kinematic viscosity is 2 mm²/s or more, favorable lubricity (load capacity resistance) is exhibited and sealing property is good, and when the kinematic viscosity is 50 mm²/s or less, energy saving is also favorable.

In addition, the molecular weight of the base oil is preferably 500 or more, more preferably 500 to 3,000, and still more preferably 600 to 2,500. The flashing point of the base oil is preferably 150° C. or higher. When the molecular weight of the base oil is 500 or more, desirable performance as the refrigerator oil can be exhibited and the flashing point of the base oil can be set to 150° C. or higher.

In the present invention, when the base oil has the above properties, the refrigerator oil composition may include, in addition to the polyvinyl ether derivative, another base oil at 50 mass % or less, preferably 30 mass % or less, and more preferably 10 mass % or less, and the refrigerator oil composition free of another base oil is still more preferred.

As the base oil that can be used together with the polyvinyl ether derivative, polyoxyalkylene glycols, or a copolymer of alkylene glycols or those monoethers and polyvinyl ethers, other polyesters, polyol ester-based compounds, polycarbonates, a hydrogenation product of α-olefin oligomer, a mineral oil, an alicyclic hydrocarbon compound, an alkylated aromatic hydrocarbon compound are exemplified.

The base oil in the present invention is particularly suitable for the above unsaturated fluorinated hydrocarbon refrigerant. However, the refrigerant is inferior in the stability because the refrigerant has an olefin structure, and hence, in order to improve the stability, a base oil including as a main component a polyvinyl ether derivative having an hydroxyl value of 17 mgKOH/g or less is used as described above in the refrigerator oil composition of the present invention.

[Appropriate Additive]

At least one kind of an additive selected from an extreme pressure agent, an oiliness agent, an antioxidant, an acid scavenger, a metal deactivator, and an anti-foaming agent can be incorporated into the refrigerator oil composition of the present invention.

(Extreme Pressure Agent)

Examples of the extreme pressure agent include phosphorus-based extreme pressure agents such as a phosphate, an acid phosphate, a phosphite, an acid phosphite, and amine salts thereof.

Of those phosphorus-based extreme pressure agents, tricresyl phosphate, trithiophenyl phosphate, tri(nonylphenyl) phosphite, dioleyl hydrogen phosphite, 2-ethylhexyldiphenyl phosphite, or the like is particularly preferable in terms of extreme pressure property, a frictional characteristic, and the like.

In addition, the examples of the extreme pressure agent include metal salts of carboxylic acids. The term "metal salts of carboxylic acids" as used herein preferably refers to metal salts of carboxylic acids each having 3 to 60 carbon atoms, and, further, aliphatic acids each having 3 to 30, and particularly preferably 12 to 30 carbon atoms. The examples further include metal salts of: dimer acids and trimer acids of the aliphatic acids; and dicarboxylic acids each having 3 to 30 carbon atoms. Of those, a metal salt of an aliphatic acid having 12 to 30 carbon atoms or of a dicarboxylic acid having 3 to 30 carbon atoms is particularly preferred.

On the other hand, a metal of which any such metal salt is constituted is preferably an alkali metal or an alkaline earth metal, and, in particular, is optimally an alkali metal.

Further, examples of the extreme pressure agents and extreme pressure agents other than those mentioned above include sulfur type extreme pressure agents such as sulfurized fat, sulfurized aliphatic acid, sulfurized ester, sulfurized olefin, dihydrocarvyl polysulphide, thiocarbamates, thioterpenes, and dialkyl thiodipropionates.

The blending amount of the above extreme pressure agent is in the range of preferably 0.001 to 5 mass % in ordinary cases, or particularly preferably 0.005 to 3 mass % with reference to the total amount of the composition in terms of lubricity and stability.

One kind of the extreme pressure agents may be used alone, or two or more kinds thereof may be used in combination.

(Oiliness Agent)

Examples of the oiliness agents include, aliphatic saturated and unsaturated monocarboxylic acids such as stearic acid and oleic acid; polymerized aliphatic acids such as dimer acids and hydrogenated dimer acids; hydroxy aliphatic acids such as ricinoleic acid and 12-hydroxystearic acid; aliphatic saturated and unsaturated monohydric alcohols such as lauryl alcohol and oleyl alcohol; aliphatic saturated and unsaturated monoamines such as stearyl amine and oleylamine; aliphatic saturated and unsaturated monocarboxylic acid amides such as lauric acid amide and oleamide; and partial esters of a polyhydric alcohol such as glycerin and sorbitol, and an aliphatic saturated or unsaturated monocarboxylic acid.

One kind of the oiliness agent may be used alone, or two or more kinds thereof may be used in combination. In addition, the blending amount of the oiliness agent is selected from the range of typically 0.01 to 10 mass %, or preferably 0.1 to 5 mass % with reference to the total amount of the composition.

(Antioxidant)

A phenol-based antioxidant such as 2,6-di-tert-butyl-4-methylphenol, 2,6-di-tert-butyl-4-ethylphenol, or 2,2'-methylenebis(4-methyl-6-tert-butylphenol) or an amine-based antioxidant such as phenyl-α-naphthylamine or N,N'-di-phenyl-p-phenylenediamine is preferably blended as the antioxidant. The antioxidant is blended in the composition at a content of typically 0.01 to 5 mass %, or preferably 0.05 to 3 mass % in terms of an effect, economical efficiency, and the like.

(Acid Scavenger)

Examples of the acid scavenger include: phenyl glycidyl ether; alkyl glycidyl ether; alkylene glycol glycidyl ether; cyclohexeneoxide; α-olefinoxide; and an epoxy compound such as epoxidized soybean oil. Of those, phenyl glycidyl ether, alkyl glycidyl ether, alkylene glycol glycidyl ether, cyclohexeneoxide, or α-olefinoxide is preferable in terms of compatibility with the refrigerant.

Each of an alkyl group of the alkyl glycidyl ether and an alkylene group of the alkylene glycol glycidyl ether may be branched, and has typically 3 to 30, preferably 4 to 24, or particularly preferably 6 to 16 carbon atoms. In addition, one having a total of generally 4 to 50, preferably 4 to 24, or particularly preferably 6 to 16 carbon atoms is used as the α-olefinoxide. In the present invention, one kind of the acid scavenger may be used, or two or more kinds thereof may be used in combination. In addition, the blending amount of the acid scavenger is in the range of preferably 0.005 to 5 mass % in ordinary cases, or particularly preferably 0.05 to 3 mass % with reference to the composition in terms of an effect and the suppression of the generation of sludge.

In the present invention, the stability of the refrigerator oil composition can be improved by blending the acid scavenger. The combined use of the extreme pressure agent and the antioxidant with the acid scavenger exerts an additional improving effect on the stability.

(Metal Deactivator and Anti-Foaming Agent)

As the metal deactivator, for example, a copper deactivator such as N—[N,N'-dialkyl (alkyl group having 3 to 12 carbon atoms) aminomethyl]triazole is exemplified. As the antifoaming agent, for example, a silicone oil, a fluorinated silicone oil, and the like are exemplified.

[Method of Lubricating Refrigerator by Using Refrigerator Oil Composition]

The refrigerator oil composition of the present invention is applied to a refrigerator employing a refrigerant including at least one kind of fluorine-containing organic compounds selected from the compounds represented by the molecular formula (A) or a combination of the fluorine-containing organic compound and a saturated fluorinated hydrocarbon compound. In particular, refrigerator oil composition is applicable to a refrigerator employing a refrigerant including an unsaturated fluorinated hydrocarbon compound.

The used amounts of any one of the various refrigerants and the refrigerator oil composition in a method of lubricating a refrigerator by using the refrigerator oil composition of the present invention are such that a mass ratio of the refrigerant to the refrigerator oil composition is in the range of preferably 99/1 to 10/90, or more preferably 95/5 to 30/70. The amount of the refrigerant below the above range is not preferable because a reduction in refrigerating capacity of the refrigerator is observed. In addition, the amount of the refrigerant beyond the above range is not preferable because the lubricity of the composition reduces. The refrigerator oil composition of the present invention, which can be used in any one of various refrigerators, is particularly preferably applicable to the compression refrigerating cycle of a compression refrigerator.

(Refrigerator)

The refrigerator to which the refrigerator oil composition of the present invention is applied has a refrigerating cycle which essentially needs a constitute of a compressor, a condenser, an expansion mechanism (such as an expansion valve), and an evaporator, or a compressor, a condenser, an expansion mechanism, a drier, and an evaporator, uses the above-mentioned refrigerator oil composition of the present invention as a refrigerator oil, and uses the above-mentioned various refrigerants as refrigerants.

Here, the drier is preferably filled with a desiccant formed of zeolite having a pore diameter of 0.33 nm or less. In addition, as the zeolite, a natural zeolite or a synthetic zeolite may be exemplified. Zeolite having a $CO_2$ gas absorbing amount of 1.0% or less at 25° C. and a $CO_2$ gas partial pressure of 33 kPa is more suitable. As the synthetic zeolite described above, XH-9 (trade name), XH-600 (trade name) manufactured by UNION SHOWA K.K., and the like are exemplified.

In the present invention, if the desiccant is used, moisture can be removed efficiently without absorbing of the refrigerant in the refrigerating cycle, and simultaneously, powderization of the desiccant due to deterioration of the desiccant itself is suppressed. Therefore, there is no possibility of clogging of pipes caused by the powderization or abnormal abrasion caused by entering of the powder into a sliding part of the compressor, whereby the refrigerator can be driven stably for a long time period.

Various sliding parts (such as a bearing) are present in a compressor in a refrigerator to which the refrigerator oil composition of the present invention is applied. In the present invention, a part composed of an engineering plastic, or a part having an organic or inorganic coating film is used as each of the sliding parts in terms of, in particular, sealing property.

Preferable examples of the engineering plastic include a polyamide resin, a polyphenylene sulfide resin, and a polyacetal resin in terms of sealing property, sliding property, abrasion resistance, and the like.

In addition, examples of the organic coating film include a fluorine-containing organic resin coating film (such as a polytetrafluoroethylene coating film), a polyimide coating film and a polyamideimide coating film in terms of sealing property, sliding property, abrasion resistance, and the like. Further, examples thereof include a thermosetting insulating film formed using a resin coating material containing a crosslinking agent and a resin substrate formed of a polyhydroxyether resin and a polysulfone-based resin.

On the other hand, examples of the inorganic coating film include a graphite film, a diamond-like carbon film, a nickel film, a molybdenum film, a tin film, and a chromium film in terms of sealing property, sliding property, abrasion resistance, and the like. The inorganic coating film may be formed by a plating treatment, or may be formed by a physical vapor deposition method (PVD).

It should be noted that a part composed of, for example, a conventional alloy system such as an Fe base alloy, an Al base alloy, or a Cu base alloy can also be used as each of the sliding parts.

[System Using Refrigerator Oil Composition]

The refrigerator oil composition of the present invention can be used in each of a car air conditioner, an electrically-driven air conditioner, a gas heat pump, an air conditioner, a cold storage, various hot water supply systems such as a vending machine or a showcase, and a refrigerating and heating system.

In the present invention, the water content in the system is preferably 300 mass ppm or less and more preferably 200 mass ppm or less. In addition, the residual air amount in the system is preferably 10 kPa or less and more preferably 5 kPa or less.

The refrigerator oil composition of the present invention mainly includes a specific oxygen-containing compound as a base oil, has so low viscosity that energy saving can be improved, and has excellent sealing property.

EXAMPLES

Next, the present invention is described in more detail by way of examples. However, the present invention is by no means limited by those examples.

It should be noted that properties of the base oil and various characteristics of the refrigerator oil composition were determined according to the following procedure.
<Properties of Base Oil>
(1) Kinematic Viscosity at 100° C.

The kinematic viscosity at 100° C. was measured according to JIS K2283-1983 by using a glass capillary viscometer.
(2) Hydroxyl Value The hydroxyl value was measured according to JIS K0070.
(3) Number Average Molecular Weight The number average molecular weight was measured by gel permeation chromatography (GPC).
(4) Flashing Point The flashing point was measured according to JIS K2265 (COC method)
<Various Characteristics of Refrigerator Oil Composition>
(5) Two-Layer Separation Temperature A measuring tube for two-layer separation temperature (internal volume: 10 mL) was filled with water (0.6 g) and a refrigerant (2.4 g) and kept in a thermostatic chamber. The temperature in the thermostatic chamber was increased from room temperature (25° C.) at a rate of 1° C./min, whereby a two-layer separation temperature was measured.
(6) Stability (Sealed Tube Test)

A glass tube was filled with an oil (4 mL) and a refrigerant (HFC1234yf) (1 g) (water content of 200 ppm), and metal catalysts of iron, copper, and aluminum, and sealed. After the glass tube was kept at an air pressure of 26.6 kPa and at a temperature of 175° C. for 30 days, oil appearance, catalyst appearance, and the presence or absence of sludge were visually observed and the acid value was measured.

The kinds of components used in preparation of the refrigerator oil composition are described below.

As the base oil, each of A1 to A7 and B1 to B7 was used. Table 1 shows the kind and the property of each base oil.

TABLE 1

| Kind of base oil | Hydroxyl value (mgKOH/g) | Kinematic viscosity at 100° C. (mm$^2$/s) | Number average molecular weight | Flashing point (° C.) |
|---|---|---|---|---|
| A1 | 2 | 7.4 | 670 | 201 |
| A2 | 3 | 10.2 | 840 | 210 |
| A3 | 5 | 20.5 | 1,120 | 228 |
| A4 | 9 | 10.3 | 830 | 211 |
| A5 | 14 | 20.5 | 1,080 | 230 |
| A6 | 19 | 10.4 | 740 | 203 |
| A7 | 30 | 10.6 | 720 | 207 |
| B1 | 3 | 9.8 | 870 | 205 |
| B2 | 5 | 25.3 | 1,210 | 234 |
| B3 | 7 | 11.2 | 860 | 213 |
| B4 | 11 | 10.7 | 850 | 208 |
| B5 | 15 | 7.2 | 645 | 198 |
| B6 | 23 | 8.5 | 570 | 202 |
| B7 | 34 | 6.7 | 480 | 182 |

[Note]
A1 to A7: a polyethyl vinyl ether (PEV)/polybutyl vinyl ether (PBV) copolymers (PEV/PBV molar ratio of 9/1) with different purification degrees in the synthesis
B1 to B7: Polyethyl vinyl ethers with different purification degrees in the synthesis In addition, as the additives, the following C1 to C4 were used.

C1: Extreme pressure agent: tricresyl phosphate
C2: Acid scavenger: C14 α-olefin oxide
C3: Antioxidant: 2,6-di-t-butyl-4-methyl phenol
C4: Anti-foaming agent: silicon-based anti-foaming agent Examples 1 to 10 and Comparative Examples 1 to 4

Refrigerator oil compositions having the compositions shown in Table 2 were prepared. HFC1234yf (2,3,3,3-tetrafluoropropene), was used as a refrigerant, and characteristics of the compositions were evaluated. Table 2 shows the results.

TABLE 2

| | | | Example | | | | |
|---|---|---|---|---|---|---|---|
| | | | 1 | 2 | 3 | 4 | 5 |
| Blending composition (mass %) | Base oil | Kind | A1 | A2 | A3 | A4 | A5 |
| | | Content | Balance | Balance | Balance | Balance | Balance |
| | Extreme pressure agent | C1 | 1 | 1 | 1 | 1 | 1 |
| | Acid scavenger | C2 | 1 | 1 | 1 | 1 | 1 |
| | Antioxidant | C3 | 0.5 | 0.5 | 0.5 | 0.5 | 0.5 |
| | Anti-foaming agent | C4 | — | — | 0.001 | 0.001 | — |
| Two-layer separation temperature of HFC1234yf [Oil content of 20 mass %] (° C.) | | | 40< | 40< | 40< | 40< | 40< |

TABLE 2-continued

| | | | | | | | |
|---|---|---|---|---|---|---|---|
| Performance evaluation | Sealed tube test | Oil appearance | Good | Good | Good | Good | Good |
| | | Catalyst appearance | Good | Good | Good | Good | Good |
| | | Presence or absence of sludge | Absent | Absent | Absent | Absent | Absent |
| | | Acid value (mgKOH/g) | 0.01> | 0.01> | 0.01> | 0.01> | 0.02 |

| | | | Example | | | | |
|---|---|---|---|---|---|---|---|
| | | | 6 | 7 | 8 | 9 | 10 |
| Blending composition (mass %) | Base oil | Kind Content | B1 Balance | B2 Balance | B3 Balance | B4 Balance | B5 Balance |
| | Extreme pressure agent | C1 | 1 | 1 | 1 | 1 | 1 |
| | Acid scavenger | C2 | 1 | 1 | 1 | 1 | 1 |
| | Antioxidant | C3 | 0.5 | 0.5 | 0.5 | 0.5 | 0.5 |
| | Anti-foaming agent | C4 | — | — | — | — | — |
| Two-layer separation temperature of HFC1234yf [Oil content of 20 mass %] (° C.) | | | 40< | 40< | 40< | 40< | 40< |
| Performance evaluation | Sealed tube test | Oil appearance | Good | Good | Good | Good | Good |
| | | Catalyst appearance | Good | Good | Good | Good | Good |
| | | Presence or absence of sludge | Absent | Absent | Absent | Absent | Absent |
| | | Acid value (mgKOH/g) | 0.01> | 0.01> | 0.01> | 0.03 | 0.04 |

| | | | Comparative Example | | | |
|---|---|---|---|---|---|---|
| | | | 1 | 2 | 3 | 4 |
| Blending composition (mass %) | Base oil | Kind Content | A6 Balance | A7 Balance | B8 Balance | B7 Balance |
| | Extreme pressure agent | C1 | 1 | 1 | 1 | 1 |
| | Acid scavenger | C2 | 1 | 1 | 1 | 1 |
| | Antioxidant | C3 | 0.5 | 0.5 | 0.5 | 0.5 |
| | Anti-foaming agent | C4 | — | — | — | — |
| Two-layer separation temperature of HFC1234yf [Oil content of 20 mass %] (° C.) | | | 40< | 40< | 40< | 40< |
| Performance evaluation | Sealed tube test | Oil appearance | Yellow | Yellowish brown | Yellow | Yellowish brown |
| | | Catalyst appearance | Slight color change by Cu | Slight color change by Cu | Slight color change by Cu | Slight color change by Cu |
| | | Presence or absence of sludge | Slight | Slight | Slight | Slight |
| | | Acid value (mgKOH/g) | 0.8 | 1.5 | 1.2 | 1.8 |

From Table 2, the following are revealed.

Any one of the refrigerator oil compositions of the present invention (Examples 1 to 10) has a two-layer separation temperature exceeding 40° C., has favorable oil appearance and catalyst appearance, and an extremely low acid value of 0.04 mgKOH/g or less.

On the contrary, while any one of the refrigerator oil compositions in Comparative Examples 1 to 4 using the polyvinyl ether derivative having a hydroxyl value exceeding 17 mgKOH/g as a base oil has a two-layer separation temperature exceeding 40° C., in the sealed tube test, the oil appearance is yellow or yellowish brown, there are a slight color change in the catalyst appearance by Cu and a slight generation of sludge, and the acid value is as high as 0.8 to 1.8 mgKOH/g.

[Industrial Applicability]

The lubricating oil composition for a refrigerator of the present invention is used for a refrigerator using a refrigerant having a specific structure, such as an unsaturated fluorinated hydrocarbon compound, the refrigerant having a low global warming potential and being applicable to, in particular, current car air conditioner systems or the like. The lubricating oil composition has excellent stability as well as excellent compatibility with the refrigerant. No generation of sludge is confirmed in a sealed tube test when the lubricating oil composition is used.

The invention claimed is:

1. A composition for a refrigerator comprising at least one refrigerant and at least one lubricating oil composition, wherein the refrigerant comprises at least one unsaturated fluorinated hydrocarbon compound selected from compounds represented by the following molecular formula (A) or comprises a combination of the unsaturated fluorinated hydrocarbon compound and a saturated fluorinated hydrocarbon compound, $$C_pO_qF_rR_s \qquad (A)$$

where: R represents H; p represents an integer of 2 to 6, q represents 0, r represents an integer of 1 to 12, and s represents an integer of 0 to 11; and one or more carbon-carbon unsaturated bonds are included, and the lubricating oil composition comprises a base oil comprising, as a main component, at least one polyvinyl ether derivative having a hydroxyl group value of 17 mgKOH/g or less.

2. The composition for a refrigerator according to claim 1, wherein the refrigerant is formed of an unsaturated fluorinated hydrocarbon refrigerant having 2 to 3 carbon atoms or a combination of a saturated fluorinated hydrocarbon refrigerant having 1 to 3 carbon atoms and an unsaturated fluorinated hydrocarbon refrigerant having 2 to 3 carbon atoms.

3. The composition for a refrigerator according to claim 1, wherein the base oil has a kinematic viscosity of 2 to 50 mm²/s at 100° C.

4. The composition for a refrigerator according to claim 1, wherein the base oil has a molecular weight of 500 or more.

5. The composition for a refrigerator according to claim 1, wherein the polyvinyl ether derivative includes as a main component a vinyl-based compound having a constituent unit represented by the following general formula (I),

[Chem 1]

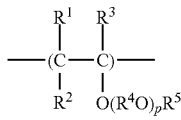
(I)

where: $R^1$, $R^2$, and $R^3$ each independently represent a hydrogen atom or a hydrocarbon group having 1 to 8 carbon atoms; $R^4$ represents a divalent hydrocarbon group having 2 to 10 carbon atoms; $R^5$ represents a hydrocarbon group having 1 to 10 carbon atoms; and p represents the number of the repeating and such a number that average value thereof is in the range of 0 to 10.

6. The composition for a refrigerator according to claim 1, comprising at least one additive selected from an extreme pressure agent, an oiliness agent, an antioxidant, an acid scavenger, a metal deactivator, and an anti-foaming agent.

7. A refrigerator comprising the composition according to claim 1 and a sliding part, wherein the sliding part in the refrigerator is formed of an engineering plastic or includes an organic coating film or an inorganic coating film.

8. The refrigerator according to claim 7, wherein the sliding part includes an organic coating film selected from the group consisting of a polytetrafluoroethylene coating film, a polyimide coating film, a polyamideimide coating film, and a thermosetting insulating film formed using a resin coating material containing a crosslinking agent and a resin substrate formed of a polyhydroxyether resin and a polysulfone-based resin.

9. The refrigerator according to claim 7, wherein the sliding part includes an inorganic coating film selected from the group consisting of a graphite film, a diamond-like carbon film, a tin film, a chromium film, a nickel film, and a molybdenum film.

10. The composition for a refrigerator according to claim 1, which is used in a car air conditioner, an electrically-driven car air conditioner, a gas heat pump, an air conditioner, a cold storage, various hot-water supply systems for a vending machine or a showcase, or a refrigerating and heating system.

11. The composition for a refrigerator according to claim 10, wherein a water content is 300 mass ppm or less and a residual air content is 10 kPa or less.

12. The composition for a refrigerator according to claim 1, wherein the unsaturated fluorinated compound is 1,2,3,3,3-pentafluoropropene (HFC1225ye) or 2,3,3,3-tetrafluoropropene (HFC1234yf).

13. The composition for a refrigerator according to claim 1, wherein the saturated fluorinated hydrocarbon compound is R32, R125, R134a, R134b, R152a or R245fa.

14. The composition for a refrigerator according to claim 1, wherein the content of the polyvinyl ether derivative in the base oil is 70 mass % or more.

15. The composition for a refrigerator according to claim 1, wherein the polyvinyl ether derivative is a polyethyl vinyl ether or a copolymer of polyethyl vinyl ether and polybutyl vinyl ether.

* * * * *